United States Patent [19]

Satoh et al.

[11] Patent Number: 5,571,638
[45] Date of Patent: Nov. 5, 1996

[54] LITHIUM SECONDARY BATTERY

[75] Inventors: Tomoari Satoh; Tatsuo Tateno, both of Tsukuba; Yasuhito Furukawa; Toshihisa Deguchi, both of Niihama, all of Japan

[73] Assignee: Sumitomo Chemical Company Limited, Osaka, Japan

[21] Appl. No.: 313,832

[22] Filed: Sep. 28, 1994

[30] Foreign Application Priority Data

| Sep. 30, 1993 | [JP] | Japan | 5-244819 |
| Jan. 28, 1994 | [JP] | Japan | 6-008351 |
| Feb. 7, 1994 | [JP] | Japan | 6-013516 |
| Apr. 26, 1994 | [JP] | Japan | 6-088294 |

[51] Int. Cl.$^6$ .................................................. H01M 2/16
[52] U.S. Cl. ....................... 429/248; 429/194; 429/218; 29/623.1; 29/623.5
[58] Field of Search ..................... 429/192, 194, 429/218, 232, 241, 248; 29/623.1, 623.5; 252/62.2, 500

[56] References Cited

U.S. PATENT DOCUMENTS

| 4,416,915 | 11/1983 | Palmer et al. | 429/218 |
| 5,300,375 | 4/1994 | Chaloner-Gill | 429/192 |
| 5,437,943 | 8/1995 | Fujii et al. | 429/192 |

FOREIGN PATENT DOCUMENTS

| 0201038 | 11/1986 | European Pat. Off. |
| 0205856 | 12/1986 | European Pat. Off. |
| 0474183 | 3/1992 | European Pat. Off. |
| 0541889 | 5/1993 | European Pat. Off. |
| 0633618 | 1/1995 | European Pat. Off. |
| 57-208079 | 12/1982 | Japan . |
| 62-90863 | 4/1987 | Japan . |
| 62-122066 | 6/1987 | Japan . |
| 266856 | 3/1990 | Japan . |
| 2075158 | 5/1990 | Japan . |
| 3167766 | 7/1991 | Japan . |
| 4115457 | 4/1992 | Japan . |
| 4188560 | 10/1992 | Japan . |

OTHER PUBLICATIONS

*Patent Abstracts of Japan*, vol. 16, No. 505 (E–1281) 19 Oct. 1992 & JP–A–04 188 560 (Matsushita).

*Chemical Abstracts*, vol. 113, No. 10, 3 Sep. 1990, Columbus, OH US; Abstract No. 82174, Goto, Fumio et al, "Composite Cathodes for Secondary Lithium Batteries and their Manufacture" & JP–A–2 075 158.

*Patent Abstracts of Japan*, vol. 15, No. 408 (E–1123) 17 Oct. 1991 & JP–A–03 167 766 (Showa Denko).

*Primary Examiner*—Bruce F. Bell
*Attorney, Agent, or Firm*—Sughrue, Mion, Zinn Macpeak & Seas

[57] ABSTRACT

Provided is a lithium secondary battery excellent in initial charge/discharge characteristics and high in capacity comprising lithium-rechargeable cathode and anode and a non-aqueous electrolyte, wherein at least one of the cathode and the anode contains one of the following (A), (B) and (C):

(A) a composite material comprising a carbon powder and a binder, which is treated with a silane coupling agent, (B) a composite material comprising a binder and a mixed carbon powder containing 70–99% by weight of a graphite powder and 30–1% by weight of a pseudo-graphitic carbon black, and (C) a composite material comprising a composite oxide powder of lithium and a transition metal, a conductive powder and a binder, which is treated with a silane coupling agent.

10 Claims, No Drawings

LITHIUM SECONDARY BATTERY

BACKGROUND OF THE INVENTION

The present invention relates to an electrode for a lithium secondary battery excellent in initial charge/discharge characteristics and cycleability and to a lithium secondary battery made using the electrode.

A lithium secondary battery having, for example, a battery construction in which an electrode containing lithiated cobalt dioxide is used as a cathode and an electrode containing a carbon material is used as an anode utilizes the electrochemical reversible reaction in which lithium from the cathode is doped into the anode through an electrolyte at a charging stage, and the lithium is undoped from the anode and doped into the cathode through the electrolyte at a discharging stage. Characteristics required for the electrodes are a large doping ability (capacity) and undoping ability (capacity) and less deterioration in capacity at the doping and undoping cycle.

From these viewpoints, various proposals have been made for electrodes containing carbon materials capable of recharging lithium and for batteries using such electrodes. Specifically, there have been proposed various batteries made using as the anode a wide variety of carbon materials including graphite materials or carbon materials having a random layer structure, such as batteries made using a graphite anode containing rechargeable lithium in the crystal (Japanese Patent Kokai (Unexamined Publn.) No. 57-208079), batteries made using an anode of a graphitic material comprising graphitizable spheroidal particles (Japanese Patent Kokai (Unexamined Publn.) No. 4-115457), batteries made using an anode of carbon material having a pseudo-graphite structure prepared by carbonizing organic polymer compounds (Japanese Patent Kokai (Unexamined Publn.) No. 62-122066), batteries made using an anode of carbon material having a specific structure (Japanese Patent Kokai (Unexamined Publn.) No. 62-90863), and batteries made using an anode of carbon material having a random layer structure (Japanese Patent Kokai (Unexamined Publn.) No. 2-66856). Furthermore, as for cathode materials, there have been proposed batteries made using as a cathode a metallic chalcogen compound or a carbon material having a specific structure prepared by carbonizing an organic polymer compound (Japanese Patent Kokai (Unexamined Publn.) No. 62-122066) and batteries made using as a cathode a composite oxide comprising an alkali metal and a transition metal and additionally Al, In or Sn (Japanese Patent Kokai (Unexamined Publn.) No. 62-90863).

As a result of experiments and investigations conducted by the inventors using a wide variety of carbon powders for electrodes, it has been confirmed that among carbon powders, graphite powders are preferred as anode materials for lithium secondary batteries in view of the fact that they have a large doping and undoping ability for lithium and the voltage at which lithium is undoped is close to the lithium potential, but there is the problem that the initial charge/discharge characteristics are insufficient and batteries of a high capacity cannot be obtained.

That is, in the case of the battery construction having an electrode containing a lithium-rechargeable material and an electrode containing a carbon powder, 100% of the lithium doped in the carbon material is not undoped in the initial stage and the utilizing efficiency of lithium is low and batteries of a high capacity cannot be obtained. In other words, a large amount of initial irreversible capacity components (irreversible capacity component=charging capacity of lithium to carbon material electrode–discharging capacity of lithium from carbon material electrode) are present in the carbon materials.

Specifically, the capacity of an electrode containing a carbon material to dope and undope lithium per unit weight differs greatly depending upon the kind of the carbon material and is about 100–300 mAH/g. However, the irreversible capacity at the initial charging and discharging is also very high, namely, about 150–600 mAH/g for graphite materials and about 1000 mAH/g for carbon black and vapor-grown carbon materials made using iron catalysts. Therefore, batteries made using the electrodes containing these carbon materials are low in utilizing efficiency of lithium and batteries of a high capacity cannot be obtained.

On the other hand, electrodes containing $LiCoO_2$ or $LiNiO_2$ which are a composite oxide of an alkali metal and a transition metal have an irreversible capacity of about 40 mAH/g at the initial charging and discharging and the utilization efficiency of lithium is insufficient.

Furthermore, in making a sheet electrode, there are problems that bonding between the current collector and the electrode layer is insufficient and separation occurs therebetween and, as a result, fabrication of the sheet electrode is difficult, or in the case of a battery made using a sheet electrode insufficient in the bonding, the electrode layer comes off from the collector due to charging and discharging to cause degradation of the cycling behavior.

SUMMARY OF THE INVENTION

An object of the present invention is to provide a lithium secondary battery of a high capacity which is excellent in initial charge/discharge characteristics by reducing irreversible capacity of electrodes at the initial charging and discharging stage and thus improving utilization efficiency of lithium.

Another object is to provide a lithium secondary battery excellent in cycleability by improving the bond strength between the current collector and the electrode layer.

As a result of conducting various investigations in an attempt to solve the above problems, the inventors have found that the irreversible capacity of an electrode containing a lithium-rechargeable material can be considerably reduced by treating the material with a silane coupling agent or by using a mixture of a graphite powder and a pseudographitic carbon black as the material and that in making a sheet electrode the bond strength between the current collector and the mixed electrode layer can be considerably improved by treating the collector with a silane coupling agent.

That is, the present invention includes the following inventions.

(1) A lithium secondary battery comprising a lithium-rechargeable cathode and anode and a nonaqueous electrolyte, characterized in that at least one of the cathode and the anode contains one of the following (A), (B) and (C):

(A) a composite material comprising a carbon powder and a binder, which is treated with a silane coupling agent, (B) a composite material comprising a binder and a mixed carbon powder containing 70–99% by weight of a graphite powder and 30–1% by weight of a pseudo-graphitic carbon black, and (C) a composite material comprising a composite oxide powder of lithium and a transition metal, a conductive powder and a binder, which is treated with a silane coupling agent;

(2) A lithium secondary battery described in the above (1), wherein the carbon powder of (A) contains a natural graphite powder or an artificial graphite powder as a sole component or a main component;

(3) A lithium secondary battery described in the above (1), wherein the graphite powder of (B) is an natural graphite powder or a artificial graphite powder and the pseudo-graphitic carbon black is a carbon powder which has an interlayer spacing ($d_{002}$) of 3.38–3.46 Å in X-ray diffraction, a crystallite size (Lc) of 50–150 Å, a true density of 1.9–2.1 and an average primary particle size of 10–100 nm;

(4) A lithium secondary battery described in the above (1), wherein the composite material (B) comprising a binder and a mixed carbon powder is treated with a silane coupling agent;

(5) A lithium secondary battery comprising a lithium-rechargeable cathode, a lithium-rechargeable anode and a nonaqueous electrolyte, characterized in that the anode contains (A) or (B) described in the above (1);

(6) A lithium secondary battery comprising a lithium-rechargeable cathode, a lithium-rechargeable anode and a nonaqueous electrolyte, characterized in that the cathode contains (C) described in the above (1);

(7) A lithium secondary battery comprising a lithium-rechargeable cathode, a lithium-rechargeable anode and a nonaqueous electrolyte, characterized in that the anode contains (A) or (B) described in the above (1) and the cathode contains (C) described in the above (1);

(8) A method for manufacturing a sheet electrode for lithium secondary batteries which comprises forming a lithium-rechargeable electrode layer on a current collector, characterized by including a step of coating the surface of the current collector with a silane coupling agent and drying it before forming the electrode layer; and (9) A lithium secondary battery comprising a lithium-rechargeable cathode, a lithium-rechargeable anode and a nonaqueous electrolyte, characterized in that at least one of the electrodes is the sheet electrode obtained by the method of the above (8).

DESCRIPTION OF THE INVENTION

First, the electrode containing the composite material (A) will be explained.

The carbon powder used in the composite material (A) may be any of those which can dope and undope lithium by charging and discharging. Examples of the carbon powder are powders of natural graphite, artificial graphite, coke, carbon black, vapor-grown carbon, carbon fibers, materials obtained by carbonizing organic polymer compounds, materials obtained by heat-treating these materials and mixtures thereof.

Especially, the carbon powder for anode is preferably one which undopes lithium at a voltage near the lithium potential and preferably comprises graphite as a sole component or as a main component. Furthermore, this graphite preferably has an interlayer spacing ($d_{002}$) of 3.37 Å or less in X-ray diffraction and a true density of 2.23 or more. The interlayer spacing ($d_{002}$) here means a value measured by an X-ray diffractometry using CuKα ray as X-ray and a high purity silicon as a standard substance [See Sugio Otani, "Carbon Fiber", P733–742 (1986) published from Kindai Henshu Sha].

The particle size of the carbon powder used in the present invention is not particularly limited, but usually is about 10 nm to 50 μm in number-average particle size.

The binder used in the composite material (A) is for binding carbon particles together and is not limitative and may be any of those which have a binding effect and a resistance against the nonaqueous electrolyte used and against the potential at the cathode and anode. Examples of the binder are fluoropolymers, polyethylene and polypropylene. The amount of the binder is preferably about 0.1–20 parts by weight, more preferably 1–12 parts by weight for 100 parts by weight in total of the powders used.

The silane coupling agent used in the composite material (A) includes the compounds represented by the following formula (1):

$$YSiX_3 \qquad (1)$$

wherein Y is $CH_2=CH-$, $CH_2=C(CH_3)COOC_3H_6-$

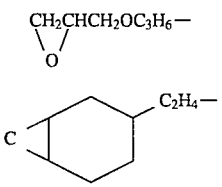

$HN_2C_3H_6-$, $NH_2C_2H_4NHC_3H_6-$, $NH_2COCHC_3H_6-$, $CH_3COOC_2H_4NHC_2H_4NHC_3H_6-$,
$NH_2C_2H_4NHC_2H_4NHC_3H_6-$, $SHC_3H_6-$, $ClC_3H_6-$, $CH_3-$, $C_2H_5-$, $C_2H_5OCONHC_3H_6-$, $OCNC_3H_6-$, $C_6H_5-$, $C_6H_5CH_2NHC_3H_6-$, $C_3HSNHC_3H_6-$, or the like and X is $-OCH_3$, $-OC_2H_5$, $-OCOCH_3$, $-OC_2H_4OCH_3$, $-N(CH_3)_2$, $-Cl$ or the like.

As examples of the silane coupling agent, mention may be made of vinyltriethoxysilane, vinyltrimethoxysilane, vinyltrichlorosilane, vinyltris(2-methoxyethoxy)silane, γ-methacryloxypropyltrimethoxysilane, γ-methacryloxypropyltriethoxysilane, γ-aminopropyltriethoxysilane, γ-aminopropyltrimethoxysilane, N-β-(aminoethyl)-γ-aminopropyltrimethoxysilane, N-β-(aminoethyl)-γ-aminopropyltriethoxysilane, γ-ureidopropyltriethoxysilane, γ-ureidopropyltrimethoxysilane, β-(3,4-epoxycyclohexyl)ethyltrimethoxysilane, β-(3,4-epoxycyclohexyl)ethyltriethoxysilane, γ-glycidoxypropyltrimethoxysilane, γ-glycidoxypropyltriethoxysilane, γ-mercaptopropyltrimethoxysilane, γ-mercaptopropyltriethoxysilane, γ-chloropropyltrimethoxysilane, γ-chloropropyltriethoxysilane, methyltriethoxysilane, methyltrimethoxysilane, phenyltriethoxysilane and phenyltrimethoxysilane.

Of these silane coupling agents, preferred are vinyltriethoxysilane, vinyltrimethoxysilane, vinyl-tris(2-methoxyethoxy)silane, γ-methacryloxypropyltrimethoxysilane, γ-methacryloxypropyltriethoxysilane, γ-aminopropyltriethoxysilane, γ-aminopropyltrimethoxysilane, N-β-(aminoethyl)-γ-aminopropyltrimethoxysilane, N-β-(aminoethyl)-γ-aminopropyltriethoxysilane, γ-ureidopropyltriethoxysilane, γ-ureidopropyltrimethoxysilane, N-β-(3,4-epoxycyclohexyl)ethyltrimethoxysilane, β-(3,4-epoxycyclohexyl)ethyltriethoxysilane, γ-glycidoxypropyltrimethoxysilane, and γ-glycidoxypropyltriethoxysilane.

More preferred are vinyltriethoxysilane, vinyltrimethoxysilane, vinyltris(2-methoxyethoxy)silane, γ-methacryloxypropyltrimethoxysilane, γ-aminopropyltriethoxysilane, N-β-(aminoethyl)-γ-aminopropyltrimethoxysilane, γ-ureidopropyltriethoxysilane, β-(3,4-epoxycyclohexyl)ethyltrimethoxysilane, and γ-glycidoxypropyltrimethoxysilane.

The mechanism in which the excellent effect can be obtained by the treatment with the silane coupling agent is not clear, but it can be considered that the surface adsorbed water or surface functional group which is considered to chemically react with lithium to prevent lithium from taking part in the charge/discharge reaction of the battery is reduced due to the improvement of water resistance (oleophilicity). Accordingly, titanate coupling agents or aluminate coupling agents which can be expected to have the similar effect are applicable.

The amount of the silane coupling agent used in the present invention is not particularly limited, but is preferably determined taking into consideration the specific surface area of the carbon powder used. That is, since it is estimated that the silane coupling agent can cover the area of about 100–600 $m^2$ per 1 g [expressed by S $(m^2/g)$] though it depends on the kind of the coupling agent, it is preferred that the amount of the silane coupling agent of A/S (g) per 1 g of the carbon powder is taken as one standard when the specific surface area of the carbon powder used is expressed by A $(m^2/g)$.

However, even when the silane coupling agent is used in such an amount as being not able to cover the total surface area of the carbon powder, the irreversible capacity can be greatly reduced. In more detail, amount of the silane coupling agent is preferably 0.01–20 parts by weight, more preferably 0.1–10 parts by weight, most preferably 0.5–5 parts by weight for 100 parts by weight of the carbon powder used.

Moreover, the method of treating the carbon powder and the binder of the composite material (A) with the silane coupling agent is not particularly limited, but as one example, mention may be made of a method which comprises reacting the silane coupling agent with water to hydrolyze a part or the whole of the silane coupling agent, mixing the hydrolysate in a desired amount with the carbon powder, drying the mixture and mixing the dried mixture with the binder. Furthermore, the treatment can also be performed by adding the silane coupling agent at the time of mixing of the carbon powder and the binder. Alternatively, the treatment can also be performed by previously adding the silane coupling agent to the binder or previously adding the silane coupling agent to a solution in which the binder is dissolved or dispersed and mixing therewith the carbon powder.

Next, the electrode containing the composite material (B) will be explained.

The graphite powder used in the composite material (B) of the present invention may be any of those which can dope and undope lithium by charging and discharging, and can be any of flaky or lamellar graphite, fibrous graphite or spheroidal graphite. The flaky or lamellar graphite is especially preferred and examples are flaky or lamellar or lamellar natural graphite and artificial graphite. Furthermore, there may be used mixtures of the flaky or lamellar graphite with fibrous graphite or spheroidal graphite.

The graphite powder used in the present invention preferably has an interlayer spacing $(d_{002})$ of 3.37 Å or less in X-ray diffraction and a true density of 2.23 or more, more preferably has an interlayer spacing $(d_{002})$ of 3.36 Å or less in X-ray diffraction and a true density of 2.24 or more. The true density here means a value measured in accordance with JIS R7222.

The ash content of the graphite powder used in the present invention is preferably 0.5% by weight or less, more preferably 0.1% by weight or less. In the case of natural graphite, since it has a high ash content of more than several % though it depends on the place of occurrence, it is desirable to reduce the ash content to preferably 0.5% by weight or less, more preferably 0.1% by weight or less by treating it at a temperature of preferably 2500° C. or higher, more preferably 2800° C. or higher. The ash content here means the value specified in JIS M8812.

The particle size of the graphite powder used in the present invention is not particularly limited, but is preferably about 1–50 μm in number-average particle size.

The pseudo-graphitic carbon black used in the present invention has an interlayer spacing $(d_{002})$ of 3.38–3.46 Å in X-ray diffraction and a true density of 1.9–2.1. Furthermore, the pseudo-graphitic carbon black preferably has a volatile content of 0.5% by weight or less. The volatile content here means the value specified in JIS M8812. The number-average primary particle size of the pseudo-graphitic carbon black is preferably about 10–100 nm and the specific surface area measured by nitrogen adsorption method is preferably about 10–300 $m^2/g$.

The pseudo-graphitic carbon black is obtained by subjecting carbon black to graphitization. Specifically, the pseudo-graphitic carbon black is obtained by heat-treating carbon black at about 1500°–3000° C., especially preferably about 2500°–3000° C. Even if carbon black is subjected to such graphitization treatment, it does not become a graphite material having an interlayer spacing $(d_{002})$ of 3.37 Å or less in X-ray diffraction and a true density of 2.23 or more. Examples of the pseudo-graphitic carbon black are those which are obtained by heat-treating carbon blacks such as furnace black prepared from creosote oil, ethylene bottom oil, natural gas, etc. or acetylene black prepared from acetylene at a high temperature of about 2500°–2800° C. When carbon black subjected to no graphitization treatment or carbon black subjected to the graphitization treatment but having an interlayer spacing $(d_{002})$ of more than 3.46 Å in X-ray diffraction, a true density of less than 1.9 or a volatile content of more than 0.5% by weight is used, no or less effect to reduce the irreversible capacity is exhibited and the potential at which lithium is undoped is higher than lithium potential. Thus, use of such carbon black is not preferable.

The proportion of the graphite powder and pseudo-graphitic carbon black will be explained. The amounts of them are 70–99% by weight of the graphite powder and 30-1% by weight of the pseudo-graphitic carbon black. Preferably, the amount of the former is in the range of 80–97% by weight and that of the latter is in in the range of 20-3% by weight and more preferably, the amount of the former is in the range of 90–96% by weight and that of the latter is in the range of 10–4% by weight. If the amount of the pseudo-graphitic carbon black is too large, the discharge capacity of the electrode containing the composite material (B) decreases and if it is too small, the irreversible capacity of the electrode increases.

The binder used in the composite material (B) can be the same as used in the composite material (A). The composite material (B) is preferably treated with a silane coupling agent. The silane coupling agent used here can be the same as used in the composite material (A). The method of treatment with the silane coupling agent is not limitative and as one example, mention may be made of a method which comprises reacting the silane coupling agent with water to hydrolyze a part or the whole of the silane coupling agent, mixing the hydrolysate in a given amount with a mixed carbon powder containing a graphite powder and a pseudo-graphitic carbon black, drying the mixture and mixing the dried mixture with a binder. Alternatively, the silane coupling agent is added at the time of mixing the mixed carbon powder with a binder or the silane coupling agent is previously added to a binder or to a solution or dispersion of the binder and the resulting mixture is mixed with the carbon powder.

The electrode containing the composite material (C) will be explained.

As the transition metal in the composite oxide powder of lithium and the transition metal used in the composite material (C), mention may be made of, for example, Co, Ni, Mn, Fe, V, Mo and Ti.

The conductive powder used in the composite material (C) is not limitative as far as it can impart electric conductivity when added in a suitable amount to the composite oxide powder of lithium and the transition metal. Examples are carbon powders such as graphite, acetylene black and carbon black and metal powders stable at the electrode potential used.

The binder and the silane coupling agent used in the composite material (C) can be the same as used in the composite material (A). The method of treatment with the silane coupling agent is not limitative and as one example, mention may be made of a method which comprises reacting the silane coupling agent with water to hydrolyze a part or the whole of the silane coupling agent, mixing the hydrolysate in a given amount with a mixed carbon powder containing a composite oxide powder of lithium and the transition metal and a conductive powder, drying the mixture and mixing the dried mixture with a binder. Alternatively, the silane coupling agent is added at the time of mixing the composite oxide powder, the conductive powder and the binder or the silane coupling agent is previously added to the binder or to a solution or dispersion of the binder and the resulting mixture is mixed with the composite oxide powder and the conductive powder.

In the lithium secondary battery of the present invention, at least one of the electrodes containing the composite material (A), (B) or (C) is used. These electrodes can be used as either the cathode or the anode of the lithium secondary battery, but the electrode containing the composite material (A) or (B) is preferably used as the anode and the electrode containing the composite material (C) is preferably used as the cathode.

The method for making the electrode for the lithium secondary batteries according to the present invention will be explained.

The composite material (A), (B) or (C) is uniformly mixed and press molded or is made into a paste using an organic solvent or the like and the paste is coated on a current collector and dried and then the coated collector is pressed.

Especially, in the method of making a sheet electrode by forming on a current collector a lithium-rechargeable electrode layer, it is preferred to include a step of coating the silane coupling agent on the surface of the current collector and drying the coat before forming the electrode layer. The silane coupling agent used here can be the same as used in the composite material (A). As the current collector, there can be used a conductor which is electrochemically stable against the cathode material, the anode material and the nonaqueous electrolyte. Examples thereof are nickel, titanium, stainless steel, copper and aluminum.

The method of coating the silane coupling agent on the surface of the current collector is not limited and one example is a method which comprises reacting the silane coupling agent with water to hydrolyze a part or the whole thereof, coating the resulting solution on the surface of the current collector and then drying the coat.

The concentration of the solution of the silane coupling agent used here is preferably about 0.01–5% by weight, more preferably about 0.1–3% by weight.

Furthermore, the surface of the current collector is preferably previously subjected to roughening treatment before coating of the silane coupling agent to further increase bonding effect. The degree of roughening is preferably about 0.1–10 μm and the toughening treatment includes, for example, mechanical polishing, electronic polishing and chemical polishing.

In the lithium secondary battery of the present invention, it is preferred to use the electrode obtained by the method of the present invention as at least one of electrodes.

As the nonaqueous electrolyte used in the lithium secondary battery of the present invention, preferred is a solution of a lithium salt in an organic solvent of high dielectric constant. The lithium salt is not limited and there may be used, for example, $LiClO_4$, $LiPF_6$, $LiBF_4$ and $LiCF_3SO_3$. Concentration of the lithium salt is usually about 0.5–1.5 mol/l. The organic solvents can be those which dissolve the lithium salt to give electrical conductivity and are electrochemically stable against the anode material and the cathode material. The organic solvents include, for example, ethylene carbonate, propylene carbonate, dimethyl carbonate, diethyl carbonate, 1,2-dimethoxy-ethane, tetrahydrofuran, acetonitrile, sulfolane and γ-butyrolactone. They are normally used as a mixed solvent of two or more.

In the lithium secondary battery of the present invention, it is preferred to use the cathode, the anode and the nonaqueous electrolyte in combination with a separator which has functions to prevent the cathode and the anode from contacting with each other and to hold the nonaqueous electrolyte and is permeable to lithium ion. As the separator, mention may be made of microporous films such as polyethylene, polypropylene and polytetrafluoroethylene and nonwoven fabrics and woven fabrics. The thickness of the separator is preferably about 10–200 μm.

The lithium secondary battery of the present invention can be in various forms such as cylindrical form, box form, coin form, button form, paper form and card form.

The present invention will be illustrated by the following nonlimiting examples and comparative examples.

Example 1

One part by weight of a silane coupling agent (A186 manufactured by Nippon Unicar Co., Ltd.) previously dispersed in pure water was added to 100 parts by weight of natural graphite (occurrence: Madagascar) powder heat-treated at 3000° C. and having a number-average particle size of 10 μm, a specific surface area of 9 m$^2$/g according to a nitrogen adsorption method, a true density of 2.26, an interlayer spacing $d_{002}$ of 3.36 Å in X-ray diffraction and an ash content of 0.05% by weight, followed by sufficiently mixing them. The mixture was vacuum-dried at 150° C. to obtain a carbon powder treated with the silane coupling agent.

Then, to 97 parts by weight of the product treated with the silane coupling agent was added, as a binder, 3 parts by weight of polyvinylidene fluoride dissolved in N-methylpyrrolidone as a solvent, followed by sufficiently kneading them. Thereafter, a part of the kneaded product was coated on a stainless steel mesh and pressed and dried to obtain an electrode containing 26.9 mg of the carbon powder.

In order to evaluate the charge/discharge characteristics of the resulting electrode, a secondary battery for evaluation was fabricated by using a lithium foil as a counter electrode, a solution (1 mol/l in concentration) prepared by dissolving lithium perchlorate in a mixture of ethylene carbonate (EC) and 1,2-dimethoxyethane (DME) (in equal volume) as a nonaqueous electrolyte and a polypropylene separator of 175 μm thick which held the said electrolyte. The open-circuit voltage of the battery for evaluation before testing was 2.95 V. Then, the electrode containing the composite material comprising the carbon powder and the binder treated with the silane coupling agent was evaluated by doping lithium in the electrode (i.e., lithium charging) with a constant current of 0.5 mA until the voltage reached 0.00 V and thereafter, undoping lithium from the electrode (i.e., lithium discharging) with a constant-current of 0.5 mA until the voltage reached 1.5 V. The results are shown in Table 1. The charging capacity in Table 1 means the capacity of doping lithium in the electrode.

Example 2

An electrode containing 27.4 mg of carbon powder was made in the same manner as in Example 1, except that A1160 manufactured by Nippon Unicar Co., Ltd. was used as the silane coupling agent, and the initial charge and discharge test with a lithium counter electrode was conducted. The results are shown in Table 1.

Example 3

75 parts by weight of the natural graphite used in Example 1, 25 parts by weight of pseudo-graphitic carbon black (TB3800 manufactured by Tokai Carbon Co., Ltd.) subjected to graphitization at 2800° C. and having a true density of 2.04, an interlayer spacing $d_{002}$ of 3.40 Å in X-ray diffraction, a crystallite size (Lc) of 120 Å, a volatile content of 0.1% by weight, a number-average primary particle size of 66 nm and a specific surface area of 30 $m^2/g$ according to nitrogen adsorption method, and, as a binder, 5.4 parts by weight of polyvinylidene fluoride dissolved in N-methylpyrrolidone as a solvent were sufficiently uniformly kneaded, and a part of the kneaded product was coated on a stainless steel mesh and pressed and dried to obtain an electrode containing 48.7 mg of carbon powder. The initial charge and discharge test was conducted in the same manner as in Example 1, except that the range of voltage was 0.00 V to 0.60 V and the results are shown in Table 1.

Example 4

An electrode containing 49.9 mg of carbon powder was made in the same manner as in Example 3, except that the natural graphite was used in an amount of 95 parts by weight, the pseudo-graphitic carbon black was used in an amount of 5 parts by weight and the polyvinylidene fluoride was used in an amount of 3.7 parts by weight, and the initial charge and discharge test was conducted. The results are shown in Table 1.

Example 5

To 91 parts by weight of lithiated nickel dioxide powder having a specific surface area of 1 $m^2/g$ measured according to nitrogen adsorption method and 6 parts by weight of acetylene black having a specific surface area of 60 $m^2/g$ as a conductive powder was added 20 parts by weight of a solution prepared by previously sufficiently mixing a silane coupling agent (A186 manufactured by Nippon Unicar Co., Ltd.) with pure water and ethanol at the silane coupling agent: pure water:ethanol=5:5:90 (part by weight). After sufficiently mixing them, the mixture was vacuum-dried at 150° C. to obtain a mixture treated with the silane coupling agent. 97 parts by weight of the mixture was mixed with 3 parts by weight of polyvinylidene fluoride (a binder) dissolved in N-methylpyrrolidone as a solvent and the resulting mixture was coated on a stainless steel mesh and pressed and dried to obtain an electrode containing 43.8 mg of lithiated nickel dioxide.

In order to evaluate the charge/discharge characteristics of the resulting electrode, a battery was fabricated in the same manner as in Example 1. The battery before the test had an open-circuit voltage of 3.11 V. Then, lithium was undoped from the electrode with a constant current of 0.5 mA until the voltage reached 4.20 V (i.e., battery charging) and thereafter, lithium was doped in the electrode with a constant current of 0.5 mA until the voltage reached 2.50 V (i.e., battery discharging). The results are shown in Table 1.

Example 6

An electrode (1) containing 25.8 mg of a mixed carbon powder of natural graphite and pseudo-graphitic carbon black was made in the same manner as in Example 3.

An electrode (2) containing 47.9 mg of lithiated nickel dioxide was made in the same manner as in Example 5 except that the mixed powder which was not treated with the silane coupling agent was used in place of the mixed powder of lithiated nickel dioxide powder and acetylene black which was treated with the silane coupling agent.

In the same manner as in Example 1, a battery was fabricated using the electrode (1) and the electrode (2) and using the same electrolyte and separator as used in Example 1. The open-circuit voltage of this battery before testing was 0.12 V. Then, the battery in which the electrode (2) was used as a cathode and the electrode (1) was used as an anode was charged with a constant current of 0.5 mA until the voltage reached 4.15 V and then discharged with a constant current of 0.5 mA until the voltage reached 2.5 V. The results are shown in Table 1.

Example 7

An electrode (3) containing 26.3 mg of carbon powder treated with a silane coupling agent was made by using the mixed carbon powder of Example 4 treated with the silane coupling agent in the same manner as in Example 1. Further, an electrode (4) containing 48.6 mg of lithiated nickel dioxide was made in the same manner as in Example 6. In the same manner as in Example 6, a battery was fabricated using these electrode and the charge and discharge test was conducted. The results are shown in Table 1.

Example 8

As a current collector of anode, a rolled copper foil of 10 μm thick was used. The both surfaces of the foil were roughened by polishing with #1200 water resistant paper and then washed with ethanol. After ethanol drying, a solution prepared by mixing a silane coupling agent (A1100 manufactured by Nippon Unicar Co., Ltd.) with pure water and ethanol at a ratio of silane coupling agent: pure water: ethanol=1:1:98 (part by weight) was coated on one surface of the copper foil and dried and then, another surface was similarly treated to obtain a current collector foil material treated with a silane coupling agent.

As for anode material, 85.5 parts by weight of the natural graphite and 4.5 parts by weight of the pseudo-graphitic carbon black used in Example 3 and 10 parts by weight of the binder of polyvinylidene fluoride dissolved in the solvent N-methylpyrrolidone were mixed in a ball mill to obtain a pasty mixture (anode paste).

The anode paste was coated by a doctor blade on one surface of the copper foil treated with the silane coupling agent and vacuum-dried at 50° C. Thereafter, another surface was also subjected to the same coating treatment to obtain a sheet coated with the electrode material on both the surfaces. Then, the sheet was pressed under a pressure of 700 kgf/cm$^2$ by a roll press to obtain a sheet electrode of anode (5) having a film thickness of 150 μm and a density of 1.75 g/cc. This sheet electrode was subjected to a bonding test and the result are shown in Table 2.

Evaluation of the bonding was conducted by the tape peeling test. The tape peeling test was conducted in the following manner. The electrode layer of the sheet electrode was cut crosswise to make 100 squares of 1 mm side. Thereafter, a cellophane tape was pressed onto the 100 squares and then, was peeled off (this was carried out continuously five times) and the number of the squares which remained on the side of the sheet electrode was counted to evaluate the bonding property.

As for the cathode material, lithiated cobalt dioxide powder, artificial graphite (KS 15 manufactured by Ronza Co., Ltd.) as a conductive material and polyvinylidene fluoride as a binder were mixed at a weight ratio of 91:6:3. Then, in the same manner as in making of the anode, a sheet electrode of cathode (6) having a film thickness of 150 μm and a density of 3.5 g/cc was made.

The thus obtained sheet electrode of anode (5) and sheet electrode of cathode (6) were laminated on a polypropylene separator of 25 μm thick. Then, the laminate was spirally wound and impregnated with a solution (1 mol/l in concentration) prepared by dissolving lithium hexafluorophosphate (LiPF$_6$) in a mixture of ethylene carbonate (EC) and diethyl carbonate (DEC) (in equal volume) as an electrolyte. Thus, a cylindrical battery was obtained.

Initial discharge capacity and cycleability of the resulting battery were measured. The initial discharge capacity here was calculated by the discharge capacity per weight of the lithiated cobalt dioxide. The cycleability was evaluated by capacity retention (%) after 40 cycles when the initial discharge capacity is 1. The results are shown in Table 3.

Example 9

A sheet electrode of anode was made in the same manner as in Example 8, except that a current collector subjected to only the treatment with a silane coupling agent was used in place of the current collector subjected to the roughening treatment and the treatment with the silane coupling agent. This was evaluated on bonding. The results are shown in Table 2.

Example 10

A sheet electrode of anode was made in the same manner as in Example 8, except that a mesophase pitch spheroidal graphite having a number-average particle size of 6 μm was used in place of the mixed carbon material of natural graphite and pseudo-graphitic carbon black powder as the material for forming the anode layer. This was evaluated on bonding. The results are shown in Table 2.

Example 11

A sheet electrode of anode was produced in the same manner as in Example 8, except that a coke having a number-average particle size of 15 μm was used in place of the mixed carbon material of natural graphite and pseudo-graphitic carbon black powder as the material for forming the anode layer. This was evaluated on the bonding. The results are shown in Table 2.

Comparative Example 1

A battery was fabricated in the same manner as in Example 1, except for using an electrode containing 27.4 mg of natural graphite powder which was not subjected to the treatment with the silane coupling agent and was vacuum-dried at 150° C. in place of the natural graphite powder subjected to the treatment with silane coupling agent, and charge and discharge test was conducted. The results are shown in Table 1.

Comparative Example 2

An electrode containing 49.0 mg of carbon powder was made in the same manner as in Example 3 except that the pseudo-graphitic carbon black was not used and 100 parts by weight of natural graphite and 3.1 parts by weight of polyvinylidene fluoride were used, and a battery was fabricated. This battery was subjected to the charge and discharge test and the results are shown in Table 1.

Comparative Example 3

An electrode containing 45.3 mg of mixed carbon powder was made in the same manner as in Example 3, except that the amount of the natural graphite was 75 parts by weight, the amount of polyvinylidene fluoride was 6.4 parts by weight and 25 parts by weight of carbon black (TB4500 manufactured by Tokai Carbon Co., Ltd.) having a true density of 1.82, an interlayer spacing $d_{002}$ of 3.63 Å in X-ray diffraction, a volatile content of 0.6% by weight, a number-average primary particle size of 40 nm and a specific surface area of 60 m$^2$/g according to nitrogen adsorption method was used, and then, a battery was fabricated. The battery was subjected to charge and discharge test. The results are shown in Table 1.

Comparative Example 4

The charge and discharge test was conducted in the same manner as in Example 5, except that an electrode containing 52.1 mg of lithiated nickel dioxide which was not subjected to the treatment with the silane coupling agent was used in place of the electrode containing lithiated nickel dioxide subjected to the treatment with the silane coupling agent. The results are shown in Table 1.

Comparative Example 5

An electrode (7) containing 26.5 mg of natural graphite was made in the same manner as in Comparative Example 1. Furthermore, an electrode (8) containing 48.7 mg of lithiated nickel dioxide was made in the same manner as in Example 6. In the same manner as in Example 6, a battery was fabricated using these electrodes, and the charge and discharge test was conducted. The results are shown in Table 1.

Comparative Example 6

A sheet electrode of anode was made in the same manner as in Example 8, except that a current collector which was subjected to neither the roughening treatment nor the treatment with the silane coupling agent was used in place of the current collector subjected to the roughening treatment and the treatment with the silane coupling agent. Evaluation on the bonding was conducted. The results are shown in Table 2.

TABLE 1

|  | Electrode | Counter electrode | Range of voltage (V) | | Capacity (mAH/g) | | |
| --- | --- | --- | --- | --- | --- | --- | --- |
|  |  |  |  |  | Charge capacity | Discharge capacity | Irreversible capacity |
| Example 1 | Carbon electrode treated with silane coupling agent | Li | 0.0 | 1.5 | 388 | 339 | 49 |
| Example 2 | Carbon electrode treated with silane coupling agent | Li | 0.0 | 1.5 | 392 | 342 | 50 |
| Comparative Example 1 | Untreated | Li | 0.0 | 1.5 | 493 | 314 | 179 |
| Example 3 | Mixed carbon electrode | Li | 0.0 | 0.6 | 388 | 303 | 85 |
| Example 4 | Mixed carbon electrode | Li | 0.0 | 0.6 | 402 | 333 | 69 |
| Comparative Example 2 | Single carbon electrode | Li | 0.0 | 0.6 | 485 | 320 | 165 |
| Comparative Example 3 | Mixed carbon electrode | Li | 0.0 | 0.6 | 505 | 272 | 233 |
| Example 5 | $LiNiO_2$ treated with silane coupling agent | Li | 2.5 | 4.2 | 203 | 179 | 24 |
| Comparative Example 4 | Untreated $LiNiO_2$ | Li | 2.5 | 4.2 | 199 | 160 | 39 |
| Example 6 | Mixed carbon electrode | $LiNiO_2$ | 2.5 | 4.15 | 395 | 242 | 153 |
| Example 7 | Mixed carbon electrode treated with silane coupling agent | $LiNiO_2$ | 2.5 | 4.15 | 393 | 259 | 134 |
| Comparative Example 5 | Single carbon electrode | $LiNiO_2$ | 2.5 | 4.15 | 399 | 192 | 207 | current collector subjected to the roughening treatment and the treatment with the silane coupling agent. Evaluation on the bonding was conducted. The results are shown in Table 2. Furthermore, a cylindrical battery was fabricated in accordance with Example 8, and the initial discharge capacity and the cycleability of the battery were measured. The results are shown in Table 3.

Comparative Example 7

A sheet electrode of anode was made in the same manner as in Example 8, except that a current collector subjected to only the roughening treatment was used in place of the current collector subjected to the roughening treatment and the treatment with the silane coupling agent. Evaluation on the bonding was conducted. The results are shown in Table 2.

Comparative Example 8

A sheet electrode of anode was made in the same manner as in Example 10, except that a current collector which was subjected to neither the roughening treatment nor the treatment with the silane coupling agent was used in place of the current collector subjected to the roughening treatment and the treatment with the silane coupling agent. Evaluation on the bonding was conducted. The results are shown in Table 2.

Comparative Example 9

A sheet electrode of anode was made in the same manner as in Example 11, except that a current collector which was subjected to neither the roughening treatment nor the treatment with the silane coupling agent was used in place of the current collector subjected to the roughening treatment and the treatment with the silane coupling agent. Evaluation on the bonding was conducted. The results are shown in Table 2.

TABLE 2

|  | Treatment of current collector | Bonding |
| --- | --- | --- |
| Example 8 | Roughening treatment + Treatment with silane coupling agent | 100 |
| Example 9 | Treatment with silane coupling agent | 60 |
| Comparative Example 6 | Untreated | 30 |
| Comparative Example 7 | Roughening treatment | 30 |
| Example 10 | Roughening treatment + Treatment with silane coupling agent | 100 |
| Comparative Example 8 | Untreated | 0 |
| Example 11 | Roughening treatment + Treatment with silane coupling agent | 100 |
| Comparative Example 9 | Untreated | 40 |

TABLE 3

|  | Treatment of current collector | Initial discharge capacity mAH/g | Cycle-ability % |
| --- | --- | --- | --- |
| Example 8 | Roughening treatment + Treatment with silane coupling agent | 122 | 80.8 |
| Comparative Example 6 | Untreated | 122 | 76.7 |

According to the present invention, an electrode for lithium secondary batteries which is reduced in irreversible capacity at the time of initial charging and discharging, improved in utilization efficiency of lithium and excellent in initial charge/discharge characteristics and cycleability can be provided and furthermore, a lithium secondary battery made using the electrode can also be provided.

What is claimed is:

1. A lithium secondary battery comprising a lithium-rechargeable cathode, a lithium-rechargeable anode and a nonaqueous liquid electrolyte, wherein at least one of the cathode and the anode contains one of the following (A), (B) and (C):

(A) a composite material comprising a carbon powder and a binder, which is treated with a silane coupling agent represented by the following formula (1):

$$YSiX_3 \quad (1)$$

wherein Y is represented by $CH_2=CH-$, $CH_2=C(CH_3)COOC_3H_6-$,

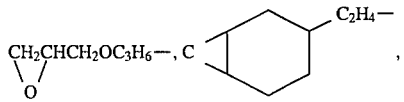

$HN_2C_3H_6-$, $NH_2C_2H_4NHC_3H_6-$, $NH_2COCHC_3H_6-$, $CH_3COOC_2H_4NHC_2H_4NHC_3H_6-$, $NH_2C_2H_4NHC_2H_4NHC_3H_6-$, $SHC_3H_6-$, $ClC_3H_6-$, $CH_3-$, $C_2H_5-$, $C_2H_5OCONHC_3H_6-$, $OCNC_3H_6-$, $C_6H_5-$, $C_6H_5CH_2NHC_3H_6-$, or $C_3H_5NHC_3H_6-$,; and X is represented by $-OCH_3$, $-OC_2H_5$, $-OCOCH_3$, $-OC_2H_4OCH_3$, $-N(CH_3)_2$, or $-Cl$, (B) a composite material comprising a binder and a mixed carbon powder containing 70–99% by weight of a graphite powder and 30–1% by weight of a pseudo-graphitic carbon black, which is treated with the silane coupling agent represented by formula (1), and (C) a composite material comprising a composite oxide powder of lithium and a transition metal, a conductive powder and a binder, which is treated with a silane coupling agent.

2. A lithium secondary battery according to claim 1, wherein the carbon powder of (A) contains a natural graphite powder or an artificial graphite powder as a sole component or a main component.

3. A lithium secondary battery according to claim 1, wherein the graphite powder of (B) is a natural graphite powder or an artificial graphite powder and the pseudo-graphitic carbon black is a carbon powder which has an interlayer spacing ($d_{002}$) of 3.38–3.46 Å in X-ray diffraction, a crystallite size (Lc) of 50–150 Å, a true density of 1.9–2.1 and a number-primary particle size of 10–100 nm.

4. A lithium secondary battery according to claim 1, wherein the anode contains the composite material (A) or (B).

5. A lithium secondary battery according to claim 1, wherein the cathode contains the composite material (C).

6. A lithium secondary battery according to claim 1, wherein the anode contains the composite material (A) or (B) and the cathode contains the composite material(C).

7. A method for manufacturing a sheet electrode for lithium secondary batteries comprising the steps of:

(i) coating a silane coupling agent in the form of a solution on the surface of a current collector, wherein the silane coupling agent is present in a concentration of from about 0.01 to 5 wt %, and wherein the silane coupling agent is represented by formula (1):

$$YSiX_3 \quad (1)$$

wherein Y is represented by $CH_2=CH-$, $CH_2=C(CH_3)COOC_3H_6-$,

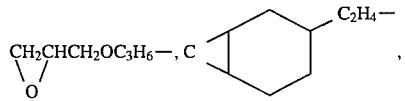

$HN_2C_3H_6-$, $NH_2C_2H_4NHC_3H_6-$, $NH_2COCHC_3H_6-$, $CH_3COOC_2H_4NHC_2H_4NHC_3H_6-$, $NH_2C_2H_4NHC_2H_4NHC_3H_6-$, $SHC_3H_6-$, $ClC_3H_6-$, $CH_3-$, $C_2H_5-$, $C_2H_5OCONHC_3H_6-$, $OCNC_3H_6-$, $C_6H_5-$, $C_6H_5CH_2NHC_3H_6-$, or $C_3H_5NHC_3H_6-$,; and X is represented by $-OCH_3$, $-OC_2H_5$, $-OCOCH_3$, $-OC_2H_4OCH_3$, $-N(CH_3)_2$, or $-Cl$, (ii) drying the surface of said current collector; and subsequently (iii) forming a lithium-rechargeable electrode layer on said current collector.

8. A lithium secondary battery comprising a lithium-rechargeable cathode, a lithium-rechargeable anode and a nonaqueous electrolyte, wherein at least one of the cathode and the anode is the sheet electrode obtained by the method of claim 7.

9. A method for manufacturing a sheet electrode according to claim 7, wherein the lithium-rechargeable electrode layer comprises one of the following composite materials (A), (B) and (C):

(A) a composite material comprising a carbon powder and a binder, which is treated with a silane coupling agent represented by the following formula (1)

$$YSiX_3 \quad (1)$$

wherein Y is represented by $CH_2=CH-$, $CH_2=C(CH_3)COOC_3H_6-$,

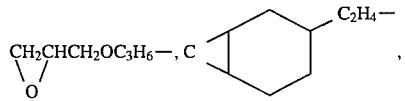

$HN_2C_3H_6-$, $NH_2C_2H_4NHC_3H_6-$, $NH_2COCHC_3H_6-$, $CH_3COOC_2H_4NHC_2H_4NHC_3H_6-$, $NH_2C_2H_4NHC_3H_6-$, $SHC_3H_6-$, $ClC_3H_6-$, $CH_3-$, $C_2H_5-$, $C_2H_5OCONHC_3H_6-$, $OCNC_3H_6-$, $C_6H_5-$, $C_6H_5CH_2NHC_3H_6-$, or $C_3H_5NHC_3H_6-$,; and X is represented by $-OCH_3$, $-OC_2H_5$, $-OCOCH_3$, $-OC_2H_4OCH_3$, $-N(CH_3)_2$, or $-Cl$, (B) a composite material comprising a binder and a mixed carbon powder containing 70–99% by weight of a graphite powder and 30–1% by weight of a pseudo-graphitic carbon black, which is treated with the silane coupling agent represented by formula (1), and (C) a composite material comprising a composite oxide powder of lithium and a transition metal, a conductive powder and a binder, which is treated with a silane coupling agent.

10. The method for manufacturing a sheet electrode according to claim 7, wherein the silane coupling agent is present in a concentration of from about 0.1 to 3 wt %.

* * * * *